Sept. 12, 1967    M. STREICHER    3,340,814
PROTECTION DEVICES FOR THE DRIVE CONNECTION
OF AN ECCENTRIC WORM PUMP
Filed Jan. 3, 1967    3 Sheets-Sheet 1

Inventor:
Max Streicher

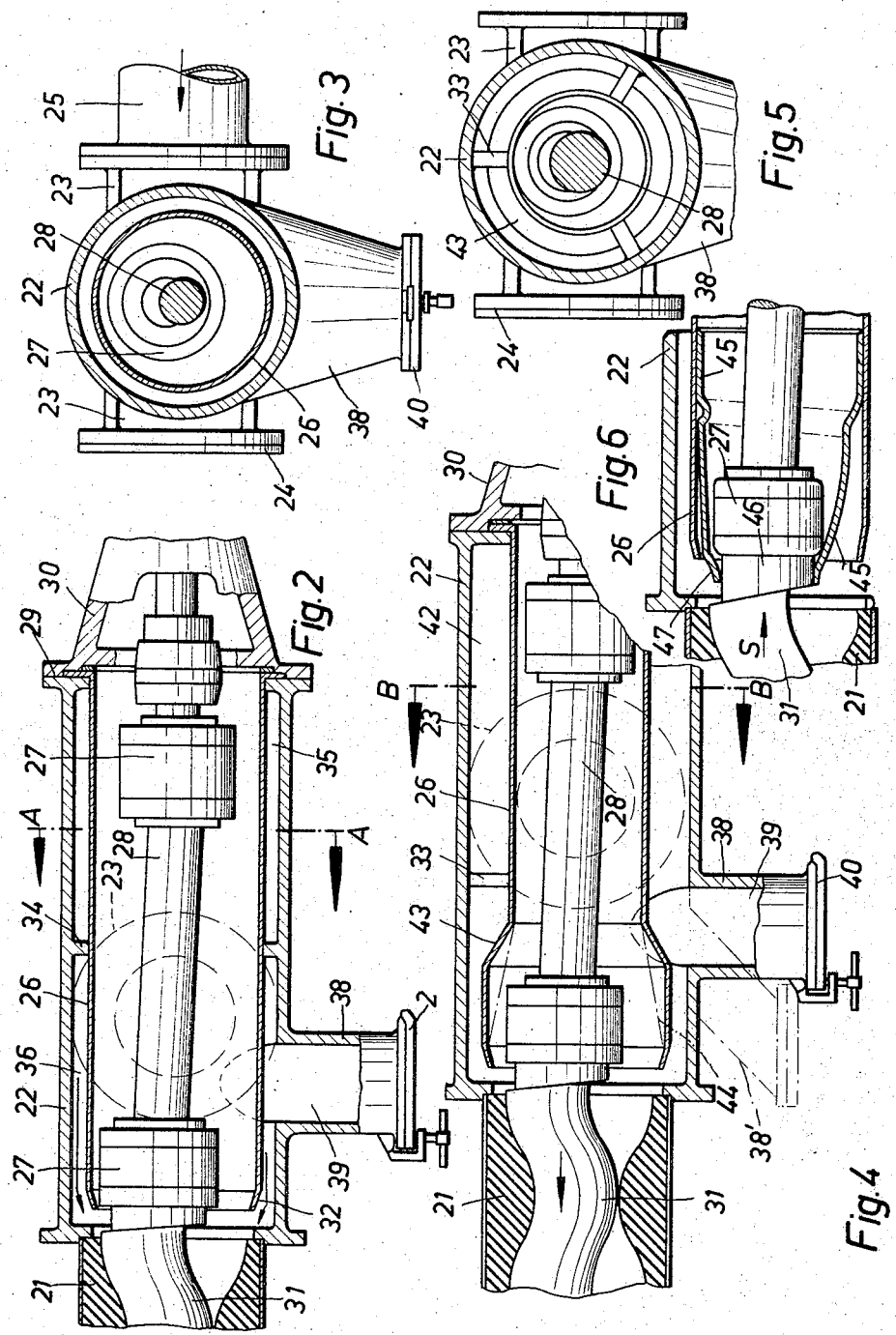

Sept. 12, 1967  M. STREICHER  3,340,814
PROTECTION DEVICES FOR THE DRIVE CONNECTION
OF AN ECCENTRIC WORM PUMP
Filed Jan. 5, 1967  3 Sheets-Sheet 3

Inventor:
Max Streicher
By Bennet␣Montague
attorney

United States Patent Office

3,340,814
Patented Sept. 12, 1967

---

3,340,814
PROTECTION DEVICES FOR THE DRIVE CONNECTION OF AN ECCENTRIC WORM PUMP
Max Streicher, Wangen, Germany, assignor of fifty percent to Oskar Seidl, Munich, Germany
Filed Jan. 3, 1967, Ser. No. 606,869
Claims priority, application Germany, Nov. 4, 1966,
St 26,078
22 Claims. (Cl. 103—117)

The present invention relates to protection devices for the drive connection in the suction housing of an eccentric worm pump, wherein the drive connection comprises link couplings and a link shaft.

Since such pumps are suitable in the practice particularly for the conveyance of media which carry mud and solid particles, care must be taken in order to avoid operational disturbances and operational interruptions, that the particles carried in the medium, as for instance stones, wood parts, straw, etc., cannot damage the sensitive structural parts disposed in the suction housing, whereby also the winding of the rotating coupling and shaft parts should be avoided.

It is, therefore, one object of the present invention to provide protection devices for the drive connection of an eccentric worm pump, wherein the driving connection of the eccentric worm pump, thus, in particular the link shaft, is disposed in a protection tube, which is supported against joint rotation on the suction housing, and which covers up in addition to the link shaft also further parts of the driving connection.

By such arrangement, damages of the rotating link shaft with its connecting parts to the link couplings, as well as the disadvantageous winding of these parts by fibers is avoided. This protection effect is exploited in accordance with the present invention in advantageous manner still by the fact, that within the protection tube, a sealing tube is provided, the ends of which are connected oil-tight to the housing chambers of the coupling, whereby between the sealing tube and the link shaft, a space is provided which extends over the length of the link shaft, which space is filled jointly with the chambers of the couplings with lubrication oil. In accordance with the present invention, the sealing tube is formed as a sealing hose consisting of elastic, workable material, which sealing hose is secured on that coupling part oil-tight, which is rigidly connected with the drive shaft and the pump rotor, respectively, whereby the sealing hose and the link shaft are disposed such, that their axles extend adjacent to each other and form an angle relative to each other, respectively.

By this arrangement, it is brought about that the oil lubrication of the link couplings, which is desired in view of the advantages, is performable very effectively with a low structural requirement. Furthermore, the link shaft and the sealing tube is protected from mechanical and chemical influences, which is of importance in particular during the conveyance of liquid manure or of chemically thick particles, for which the eccentric worm pumps are particularly suitable. It is very advantageous thereby for the lubrication and cooling of the moved parts, that during the rotating movements, the axles of the clamped yieldable sealing hose and of the rigid shaft moved in dependency upon the links are displaced in crosswise direction relative to each other during the rotating cycle, whereby the oil is maintained at a constant movement, so that the best presumptions for a highly effective lubrication of all link parts free from service are given.

In accordance with another object of the present invention, which is particularly suitable for eccentric screw pumps of larger dimensions, a tube is secured in the suction housing, which is extending with the same axis as that of the suction housing and covering the link shaft with the link couplings, which tube extends to the direct vicinity of the pump. By this arrangement, it is brought about that the medium entering the housing is no more, as it was the case before, flowing around the link shaft and the link couplings, rather between the covering tube and the housing inner wall with corresponding speed to the rotor, so that at least the rough admixtures, which are dangerous for the operation, cannot enter any more into the range of the rotating parts. Furthermore, a better liquid guide is obtained such, that the stream resistance is lowered compared with the resistance experienced before, and thereby the conveyance effect of the pump is increased.

In accordance with a further proposal of the present invention, the annular space defined by the outer jacket of the covering tube and the inner wall of the suction housing has a passing cross-section, which corresponds about the suction capacity of the pump. By this arrangement, upon the corresponding selection of the diameter of the covering tube and of the suction housing the passing width of the annular space can be measured such, that bodies of an order endangering the operation of the pump, cannot pass the annular space.

In order to prevent stoppage of the annular space by the retained bodies, in accordance with the present invention, the suction conduit and the suction housing, respectively, is equipped with a vertically downwardly extending settling space having a closable cleaning opening. In this space are mounted the parts which are moving along the tube and the housing wall, respectively, in view of their own weight. Furthermore, the sedimentation or settling space can be used simultaneously as easily accessible cleaning connecting branch for the spaces of the suction housing.

A very reliable size limitation of the entrained solid particles with consideration of the reverberation absorption capacity of the pump and thereby an effective measure against disturbances of the operation can be obtained in accordance with the present invention such, that in connection with the protection tube covering discs are provided which are connected with the rotor and/or with the housing of the suction space and which make settable or adjustable a greatest radial passing width for the conveyor medium, which passing width is smaller than the free passing width of the pump. In accordance with the present invention, the pump rotor extending thereby into the cylindrical suction space or a part rigidly connected therewith is equipped with a circular covering disc concentric to the rotor axis, the radius of the covering disc being smaller for about the measure of the eccentricity of the rotor, than the radius of the cylindrical suction space.

By these means, one has the possibility to determine the core size of the rigid material to be screened such, that the passing cross-sections freed by the covering elements are adjusted relative to each other, so that the corresponding disturbance-sources are removed to a great extent.

With these and other objects in view which will become apparent in the following detailed description, the present invention will be clearly understod in connection with the accompanying drawings, in which:

FIG. 2 is a longitudinal section of the device with a continuous covering tube;

FIG. 3 is a section along the lines A—A of FIG. 2;

FIG. 4 is a longitudinal section if another embodiment of the covering tube;

FIG. 5 is a section along the lines B—B of FIG. 4;

FIG. 6 is an axial section of the covering tube having a sleeve;

Figure 1:
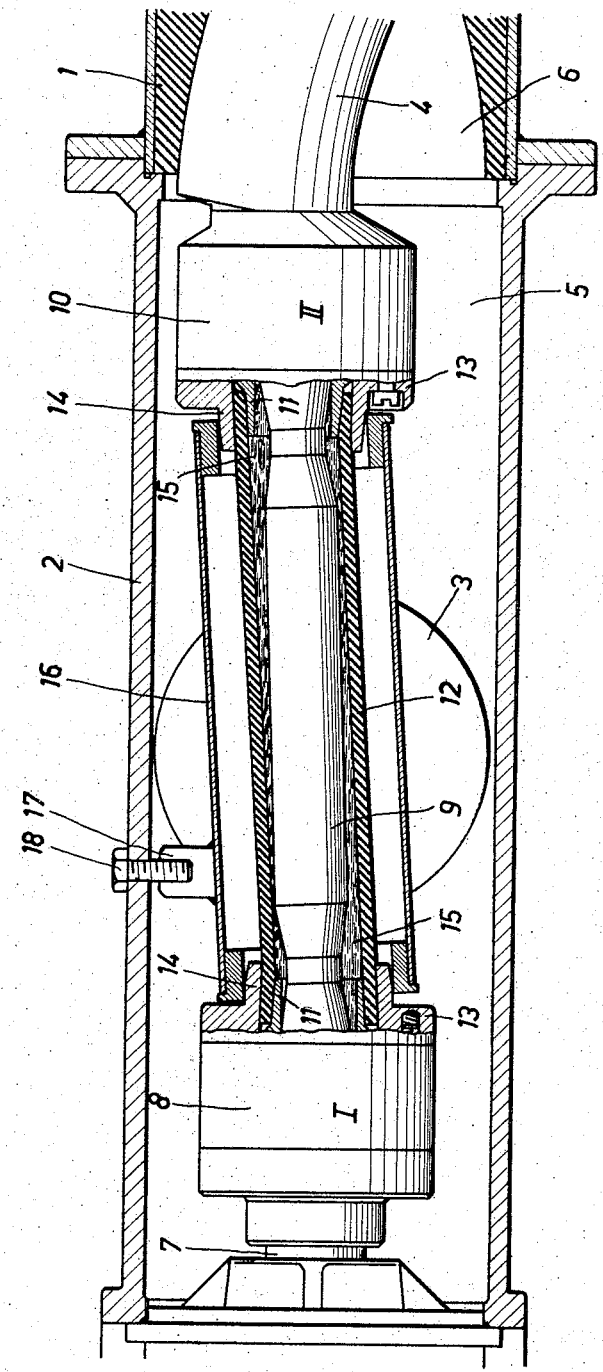
FIGURE 1 is an elevation partly in section of one embodiment of the present device with a protecting tube.

Referring now to the drawings, and in particular to FIGS. 1–4, the protection device, designed in accordance with the present invention, comprises a stator 1 of the eccentric worm pump which is connected to a housing 2, in which housing 2 a suction branch 3 terminates and from which suction branch 3 the conveyor medium is sucked into the spaces 5 and 6 by the rotating movements of the pump rotor 4. A drive shaft 7 is inserted into the housing 2 and is there connected with the primary part, for instance, the housing 8 of the first coupling I capable of angular motions. Its secondary part (not shown) is connected with a link shaft 9, which is connected with the secondary part of the second coupling II. The primary part 10 and the housing of this coupling, respectively, is connected for joint rotation with the pump rotor 4. The parts 8 and 10 have socket-like sleeves 11, over which the ends of the sealing hose 12 slide and are pressed to the sleeves 11 by means of flange members 13, to be screwed to the parts 8 and 10, and are clamped between the latter and the annular lugs 14. The space 15 between the sealing hose 12 and the link shaft 9 is filled with oil and continues into the inside of the space links, where under circumstances, a possibly complete distribution of the oil is taken care of by means of bores and grooves.

As can be ascertained from the drawings, the shaft 9 does not extend with parallel axles to the sealing hose 12 due to the limberness of the sealing hose, which is desirable in the present instance for obtaining an oil movement. This effect can still be enhanced if, for instance, the socket-like lug 11 is disposed eccentrically to the housing parts 8 and 10, and, to the link axis, respectively.

A tube 16 can slide over the sealing hose 12, which tube 16 can engage loosely the lugs 14 and serves mainly for the purpose of prevention of winding by fibers, straw and the like, which is of a great disadvantage for the conveyor process. For this purpose, the tube 16 is equipped with an abutment 17 which supports itself on a screw bolt 18 secured in the housing 2 and thereby prevents the tube 16 from joining the rotation.

In order to prevent the abutment 17 from becoming damaged by a hard object entrained in the stream, or from being torn off, the protecting tube 16 can also be of elastic material, for instance, rubber and a textile insert, so that a certain yielding in crosswise direction is present.

Referring now to the embodiments disclosed in FIGS. 2–6; a suction housing 22 connected with a stator 21 of a pump is equipped with two suction branches 23, one of which is closed up by a plate 24. In the housing 22 is disposed a tube 26 which is arranged coaxially with the housing 22 and which tube 26 covers up the two link couplings 27 and the link shaft 28. The covering tube 26 is flanged into the connection 29 with the bearing housing 30 and extends up to the vicinity of the pump rotor 31. In this range, the tube end 42 is conically narrowed. Furthermore, supporting means, for instance, individual supports 33 or a supporting ring 34 (FIG. 2), which closes up simultaneously the rearward portion 35 of the annular chamber 36 are provided on the housing 22 or at the tube 26.

A further branch 38 is arranged on the suction housing 22, which branch 38 defines a settling chamber 39, which terminates between the suction branches 23 and the pump into the housing chamber, and which is closable by a tightly closing cover 40. Since the medium flows through the suction branch 23 crosswise to the longitudinal axis of the covering tube 26 into the annular chamber 36, and is converted simultaneously by the suction effect of the pump into the longitudinal axis, the medium has within the range of the settling chamber 39 a tangential movement, which flushes the heavy admixtures into the settling chamber 39. The medium flows then with high speed in axial direction to the pump chamber, whereby the conical end 32 of the covering tube 26 reduces the stream resistance prior to its entrance into the stator 21. The medium is fed by the suction effect of the pump over the edge 32 of the covering tube 26, so that a return flow into the inside of the covering tube is avoided in sufficient manner.

The protection effect aimed at by the present invention can still be enhanced, if the covering tube 26 is formed in accordance with FIGS. 4 and 5 of the drawings. Here the outer diameter of the tube 26 is maintained as small as possible within the range of the suction branch 23, so that an annular chamber 42 having a large cross-sectional area and, thereby, a low flow speed, is formed, whereby the settling of the admixtures is favored. At about the settling chamber 39, the tube 26 is widened by a conically expanding portion 43 to its largest diameter, so that here the medium flows with high speed over the edge of the covering tube towards the pump.

The amply measured settling chamber 39 can be emptied easily upon opening of the cover 40. Since its mouth extends over one-third of the cross-sectional area of the suction housing 22, the branch 38 can also be used for cleaning the housing chamber 26 and of the cleaning space 26/42, respectively.

In pumps which operate with a great number of revolutions, the correspondingly high stream speed can be recognized such that, as shown in FIG. 4 in point-dotted lines, the diameter of the covering tube 26 is widened by a conical member 44 extending up to the tube end 32. Accordingly, it is also possible, as likewise indicated in point-dotted lines, to set the branch 38′ with the settling chamber 39 obliquely in the direction of the stream downwardly.

Referring now to FIG. 6, an embodiment is disclosed in which an elastic sleeve is secured to the covering tube 26, for instance, by vulcanization. This sleeve covers the link coupling 27 disposed on the rotor side and surrounds with a slight pretension the connecting member 46. In case of a flow direction S, the sleeve neck 47 is pressed towards the connection member 46, so that a penetration of the medium into the inner chamber of the covering tube is prevented. The engaging faces of the sleeve neck 47 with the rotating parts are continuously lubricated by the liquid medium, so that friction and wear at these points is at a minimum.

The settling chamber 39 can also be disposed at another suitable point within the suction range, for instance, on the suction branch 23.

Figure 7:
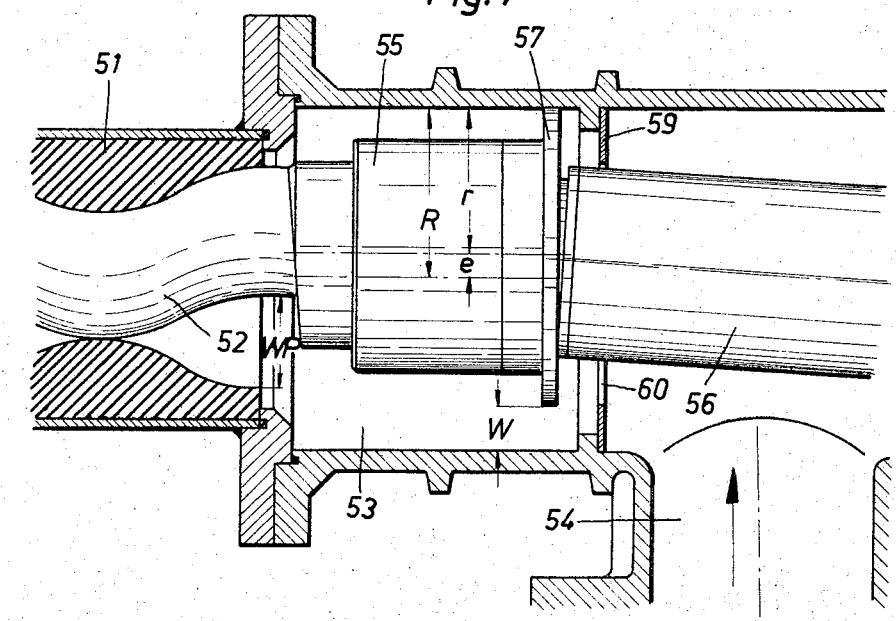
FIG. 7 is still another embodiment of the present device, including covering discs.
Figure 8:
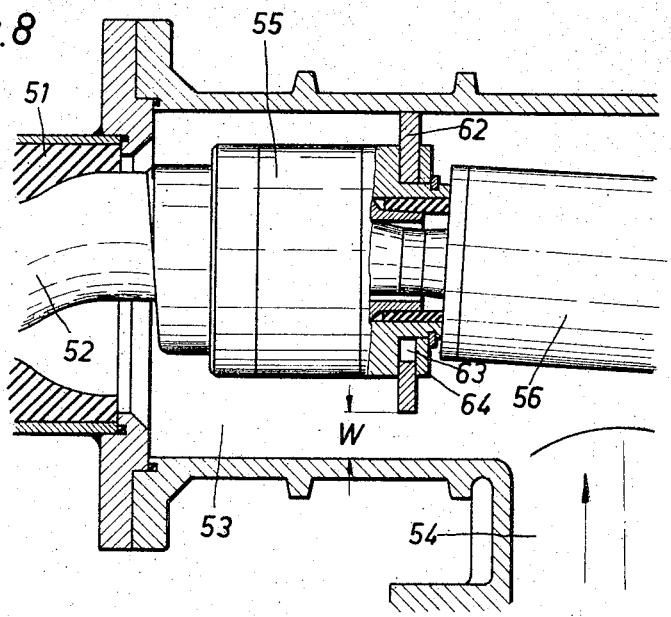
FIG. 8 is yet another embodiment of the present device with a radially movable covering disc.

Referring now again to the drawings, and in particular to FIGS. 7 and 8, the suction side of the eccentric worm pump is disclosed, which comprises a stator 51 and a rotor 52. A suction branch having a cylindrical suction chamber 53 is connected to the stator 51, which suction branch 53 terminates into the actual suction conduit 54. In the chamber 53 is disposed the link coupling 55 over which the rotor 52 is coupled with the link shaft 56. A circular covering disc 57 is disposed at the housing of the coupling 55 concentrically to the coupling 55, so that it joins its eccentric movements. The disc 57 is suitably made of a hard elastic synthetic material, the radius r of which is smaller for the value e of the eccentricity of the rotor 52, than the radius R of the suction chamber 53. By this arrangement, always a crescent-shaped passage remains open between the housing wall and the disc 57, the greatest radial passage width W of which can be arranged such, that it is smaller than the free passage width WP of the pump, whereby the total passage cross-section of the crescent-shaped chamber corresponds to the specific or larger conveying capacity of the pump.

Since, however, the value W is limited downwardly by the stated conditions, this arrangement does not suffice in each case, in order to obtain the desired screening. In accordance with the present invention, thus, a further cover 59 is provided on the suction branch which has a circular passage opening 60 for the shaft 56 and its covering tube, respectively. Since these parts move likewise eccentrically, a crescent-shaped passage space remains also open. This chamber can be varied likewise in certain limits, so that a further adjustment possibility for the determination of the permissible core size is given.

In accordance with another feature of the present invention, particularly the widening of the freedom in the selection of the size of the solid bodies to be removed is made possible. As shown in FIG. 8, for this purpose a cover disc 62 is employed, which sits likewise on the hub of the coupling 55 and is axially immovable, however, radially displaceably guided. The disc 62 is formed as a circular ring, the concentric circular cut-out 63 of which has a larger radius than the hub of the coupling 55 carrying the disc 62. By this arrangement, a radial play space 63 is created, which permits the arrangement of the radius of the disc 62 larger, than it is possible in the embodiment according to FIG. 7, so that here, the passing width W can be reduced to the limit of the necessary suction cross-section.

In order not to interfere thereby with the radial movability of the disc 62, it is suitable to provide the diameter of a guide 64 so large that the play space 63 remains covered towards the outside.

While I have disclosed several embodiments of the present invention, it is to be understood that these embodiments are given by example only and not in a limiting sense, the scope of the present invention being determined by the objects and the claims.

I claim:
1. A protection device for a driving connection in the suction housing of an eccentric worm pump, comprising
a housing,
a stator of an eccentric worm pump connected with said housing,
a rotor operatively connected with said stator,
said housing defining at least one cylindrical suction chamber,
a drive shaft disposed in said housing,
a first coupling permitting an angular motion,
a link shaft operatively connected at one of its ends with said first coupling,
a second coupling permitting an angular motion and operatively connected with the other of the ends of said link shaft,
a protection tube disposed in said housing,
means for supporting said protection tube in said housing, thereby preventing rotation of said protection tube, and
said protection tube covering at least said link shaft.

2. The protection device, as set forth in claim 1, which includes
a sealing tube disposed inside of said protection tube,
said couplings include housing chambers,
the ends of said sealing tube being secured oil-tight to said housing chambers, and
a chamber defined along the entire length of and between said sealing tube and said link shaft, said chamber and said housing chambers being adapted to be filled with oil.

3. The protection device, as set forth in claim 2, wherein
said sealing tube comprises a sealing hose of elastic, felt-like material and is connected oil-tight with one of said couplings rigidly connected with said drive shaft and said rotor, respectively.

4. The protection device, as set forth in claim 2, wherein
the longitudinal axis of said sealing hose and that of said link shaft are disposed adjacent each other.

5. The protection device, as set forth in claim 2, wherein
the longitudinal axis of said sealing hose and that of said link shaft define an angle relative to each other.

6. The protection device, as set forth in claim 2, wherein
said sealing tube comprises rubber having a fabric ply.

7. The protection device, as set forth in claim 1, wherein
said protection tube has a longitudinal axis identical with that of said housing and extends to the close vicinity of the worm pump.

8. The protection device, as set forth in claim 7, wherein
the outer face of said protection tube defines jointly with the inner wall of said housing an annular chamber having a cross-sectional flow area corresponding with the suction capacity of the pump.

9. The protection device, as set forth in claim 1, which includes
an additional branch extending vertically downwardly from said housing and having a closable opening, and
said additional branch defining a settling chamber and adapted to be opened for cleaning said housing.

10. The protection device, as set forth in claim 1, which includes
a suction conduit leading into said housing,
an additional branch extending vertically downwardly from said suction conduit and having a closable opening, and
said additional branch defining a settling chamber and adapted to be opened for cleaning said suction conduit.

11. The protection device, as set forth in claim 10, wherein
said protection tube has a first portion having a smaller diameter within the range of said suction conduit and a second portion disposed behind said settling chamber and having a larger diameter than that of said first portion, and
a conical connecting member connecting said first and second portions.

12. The protection device, as set forth in claim 1, which includes
a bearing housing disposed adjacent one end of said housing, and
said protection tube is flanged in between said bearing housing and said housing and is cantilevered over its entire length.

13. The protection device, as set forth in claim 1, wherein
said supporting means comprises a supporting member secured to said protection tube.

14. The protection device, as set forth in claim 1, wherein
said supporting means comprises a supporting ring secured to the inner wall of said housing.

15. The protection device, as set forth in claim 1, wherein
the end of said protection tube disposed adjacent said rotor is conically narrowed down to a smaller diameter.

16. The protection device, as set forth in claim 1, which includes
a sleeve of elastic synthetic material closing the opening on the rotor side of said covering tube,
as well as a connecting member connecting said rotor with said link shaft,
said sleeve is secured at one end to said protection tube and at the other end surrounds with slight pretension said connecting member.

17. The protection device, as set forth in claim 16, wherein
said sleeve is formed as a protection hose secured to said housing by means of a flange connection jointly with said protection tube.

18. The protection device, as set forth in claim 1, which includes cover discs disposed in connection with said protection tube, said cover discs are connected wtih said rotor and said housing, respectively, and render adjustable the greatest radial passage width for the medium to be conveyed, and said greatest radial passage is smaller than the free passage width of said pump.

19. The protection device, as set forth in claim 18, wherein at least a part rigidly secured to said rotor extending into a cylindrical suction chamber has a circular cover disc disposed concentrically to the rotor axis, the radius of said cover disc is smaller for the eccentricity of said rotor than the radius of said cylindrical suction chamber.

20. The protection device, as set forth in claim 18, wherein said cover discs are guided radially displaceably by a member disposed concentrically relative to the rotor axis and form a circular ring, the circular opening of said cover discs has a play relative to the hub supporting said cover discs, and said play absorbing during rotation of said rotor the difference between the radius of said suction chamber and the radius of said disc.

21. The protection device, as set forth in claim 20, wherein said member guiding radially displaceably said cover discs comprises the housings of said link couplings.

22. The protection device, as set forth in claim 1, which includes a cover disc disposed in and connected with said housing of said cylindrical suction chamber, said cover disc has a circular passage opening concentric to said suction chamber for passing said link shaft of said link couplings, and the diameter of said passing opening being chosen such that the largest passage area is smaller than the free passage area of said pump.

References Cited

UNITED STATES PATENTS

| | | | |
|---|---|---|---|
| 2,621,605 | 12/1952 | Mark | 103—117 |
| 2,695,565 | 11/1954 | Seinfeld | 103—117 |
| 2,695,694 | 11/1954 | Seinfeld | 103—117 |
| 2,915,979 | 12/1959 | Bourke et al. | 103—117 |
| 3,097,609 | 7/1963 | Nechine | 103—117 |

FOREIGN PATENTS 1,361,840  4/1964  France.

DONLEY J. STOCKING, *Primary Examiner.*

W. J. GOODLIN, *Assistant Examiner.*

UNITED STATES PATENT OFFICE
CERTIFICATE OF CORRECTION

Patent No. 3,340,814                              September 12, 1967

Max Streicher

It is hereby certified that error appears in the above numbered patent requiring correction and that the said Letters Patent should read as corrected below.

In the heading to the printed specification, line 7, after "Germany," insert -- Dec. 31, 1965, St 24,832; Dec. 31, 1965, St 24,833 --.

Signed and sealed this 20th day of August 1968.

(SEAL)
Attest:

Edward M. Fletcher, Jr.                          EDWARD J. BRENNER

Attesting Officer                                    Commissioner of Patents